(12) United States Patent
Inoue

(10) Patent No.: US 9,068,519 B2
(45) Date of Patent: Jun. 30, 2015

(54) CONTROL APPARATUS FOR INTERNAL COMBUSTION ENGINE

(75) Inventor: Masahiro Inoue, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 351 days.

(21) Appl. No.: 13/384,926

(22) PCT Filed: Apr. 7, 2011

(86) PCT No.: PCT/JP2011/058800
§ 371 (c)(1),
(2), (4) Date: Jan. 19, 2012

(87) PCT Pub. No.: WO2012/137331
PCT Pub. Date: Oct. 11, 2012

(65) Prior Publication Data
US 2012/0259532 A1  Oct. 11, 2012

(51) Int. Cl.
B60T 7/12 (2006.01)
F02D 23/02 (2006.01)
F02D 41/00 (2006.01)
F02D 41/04 (2006.01)
F02B 37/18 (2006.01)

(52) U.S. Cl.
CPC ............ *F02D 23/02* (2013.01); *F02D 41/0007* (2013.01); *F02D 41/047* (2013.01); *F02D 2250/34* (2013.01); *Y02T 10/144* (2013.01); *F02B 37/18* (2013.01); *F02D 2200/0406* (2013.01)

(58) Field of Classification Search
USPC ......... 60/274, 280, 286, 287, 295; 123/90.15, 123/90.17, 347, 568.16; 701/104, 108
See application file for complete search history.

(56) References Cited

U.S. PATENT DOCUMENTS 4,492,203 A * 1/1985 Yutaka ........................ 123/478
5,706,782 A * 1/1998 Kurihara ...................... 123/399

(Continued)

FOREIGN PATENT DOCUMENTS

JP 01-200040 A 8/1989
JP 05-044527 A 2/1993

(Continued)

OTHER PUBLICATIONS

International Search Report & Written Opinion mailed Jul. 12, 2011 of PCT/JP2011/058800.

(Continued)

*Primary Examiner* — Stephen K Cronin
*Assistant Examiner* — Joseph Dallo
(74) *Attorney, Agent, or Firm* — Kenyon & Kenyon LLP

(57) ABSTRACT

An object of this invention is, even when executing WGV control, to stably control an air-fuel ratio in parallel therewith. An ECU calculates a WGV correction coefficient Kv based on a degree of opening of a waste gate valve (WGV) and calculates a wall-surface fuel adherence amount FMW that is an amount of fuel adhering to a wall surface of an intake port by adding a base wall-surface adherence amount FMWB, the WGV correction coefficient Kv, a water temperature correction coefficient Kt, and a load factor change correction coefficient Kdl. The calculated wall-surface fuel adherence amount FMW is added to a fuel injection amount ETAUout. Thus, a state of a blowback amount of exhaust gas that varies with the degree of opening of the WGV can be reflected in the fuel injection amount.

5 Claims, 8 Drawing Sheets

(56) References Cited

U.S. PATENT DOCUMENTS

| | | | |
|---|---|---|---|
| 7,331,317 B2* | 2/2008 | Yasui et al. | 123/90.15 |
| 7,600,372 B2* | 10/2009 | Nishiumi | 60/286 |
| 7,716,924 B2* | 5/2010 | Tanaka | 60/301 |
| 2009/0071152 A1* | 3/2009 | Kipping et al. | 60/611 |
| 2013/0167508 A1* | 7/2013 | Nishimura | 60/274 |

FOREIGN PATENT DOCUMENTS

| | | |
|---|---|---|
| JP | 07-091266 A | 4/1995 |
| JP | 10-159632 A | 6/1998 |
| JP | H11-50874 A | 2/1999 |
| JP | 2003-027977 A | 1/2003 |
| JP | 2006-170017 A | 6/2006 |
| JP | 2007-154836 A | 6/2007 |
| JP | 2008-297930 A | 12/2008 |

OTHER PUBLICATIONS

Machine translation of Japanese Application No. Hei10-159632 (already of record), now cited in CN Office Action dated Sep. 26, 2014.

* cited by examiner

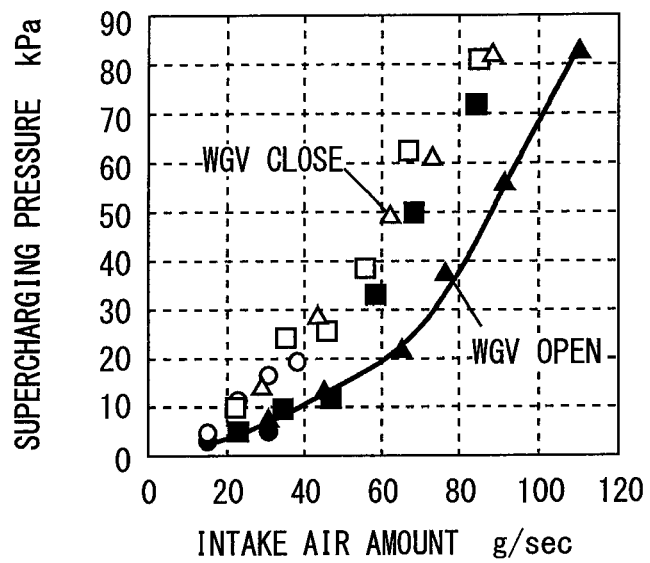
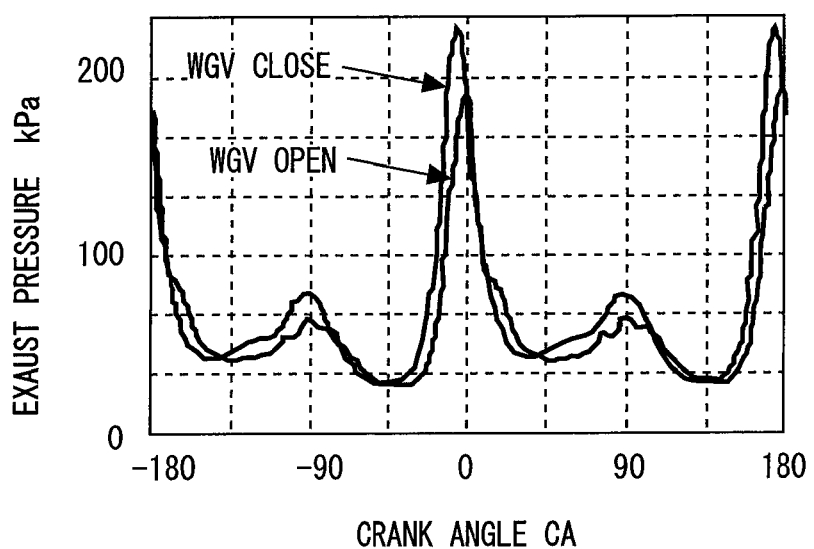

CONTROL APPARATUS FOR INTERNAL COMBUSTION ENGINE

This is a 371 national phase application of PCT/JP2011/058800 filed 7 Apr. 2011, the contents of which are incorporated herein by reference.

TECHNICAL FIELD

The present invention relates to a control apparatus for an internal combustion engine equipped with a supercharger and a waste gate valve (WGV), that is favorably used, for example, as a vehicle engine.

BACKGROUND ART

The conventional technology includes a control apparatus for an internal combustion engine that is configured to control a fuel injection amount using a dynamic behavior model of fuel, as disclosed in, for example, Patent Literature 1 (Japanese Patent Laid-Open No. 10-159632). According to the conventional technology, a wall-surface fuel adherence rate that is the proportion of fuel that adheres to a wall surface of an intake port or the like, and a wall-surface fuel residual rate that is the proportion of adhered fuel that remains on a wall surface are variably set as parameters of a dynamic behavior model, and a fuel injection amount is corrected using these parameters. The applicants are aware of the following literature, which includes the above described literature, as literature related to the present invention.

CITATION LIST

Patent Literature

Patent Literature 1: Japanese Patent Laid-Open No. 10-159632
Patent Literature 2: Japanese Patent Laid-Open No. 2008-297930
Patent Literature 3: Japanese Patent Laid-Open No. 5-44527
Patent Literature 4: Japanese Patent Laid-Open No. 1-200040

SUMMARY OF INVENTION

Technical Problem

With respect to engines equipped with a supercharger, control is known that actuates a WGV to appropriately adjust a back pressure in order to achieve both supercharging responsiveness and efficient fuel consumption in a compatible manner. However, according to the conventional technology, there is the problem that the controllability of the air-fuel ratio is liable to deteriorate when it is attempted to execute this kind of WGV control. More specifically, when executing WGV control, a blowback amount of exhaust gas that flows back to an intake port changes accompanying changes in the back pressure, and there is a strong correlation between the blowback amount of exhaust gas and the amount of fuel that adheres to a wall surface. According to the conventional technology, since changes in the back pressure (changes in the degree of opening of the WGV) are not taken into consideration, when WGV control is executed there is a concern that the amount of fuel adhering to a wall surface will fluctuate in accordance with changes in the back pressure and therefore the air-fuel ratio will be disturbed.

The present invention has been conceived to solve the above described problem, and an object of the present invention is to provide a control apparatus for an internal combustion engine that, even when executing WGV control, can stably control the air-fuel ratio in parallel with the WGV control.

Means for Solving the Problem

A first aspect of the present invention is a control apparatus for an internal combustion engine, comprising:
a fuel injection valve that injects a fuel into intake air of the internal combustion engine;
a supercharger that has a turbine provided in an exhaust passage and a compressor provided in an intake passage of the internal combustion engine, and that supercharges intake air utilizing an exhaust pressure;
a waste gate valve that adjusts an amount of exhaust gas that flows by bypassing the turbine of the supercharger;
fuel adherence amount calculation means that calculates a wall-surface fuel adherence amount that is an amount of fuel adhering to a wall surface of the internal combustion engine among the fuel injected from the fuel injection valve, and that acquires a degree of opening of the waste gate valve or an indicator corresponding to the degree of opening as a WGV parameter and calculates the wall-surface fuel adherence amount based on at least the WGV parameter; and
fuel adherence amount reflecting means that causes the wall-surface fuel adherence amount to be reflected in a fuel injection amount that is set based on an operating state of the internal combustion engine.

In a second aspect of the present invention, the control apparatus for an internal combustion engine according to claim 1, wherein the fuel adherence amount calculation means is configured to increase a calculation value of the wall-surface fuel adherence amount in accordance with an increase in the degree of opening of the waste gate valve.

In a third aspect of the present invention, the control apparatus for an internal combustion engine according to claim 1 or 2, wherein the fuel adherence amount calculation means comprises:
base calculation means that calculates the wall-surface fuel adherence amount based on at least one parameter among a group of parameters comprising a number of engine revolutions, a load, an engine temperature, and an amount of change in the load of the internal combustion engine; and
WGV correspondence correction means that corrects the wall-surface fuel adherence amount based on the WGV parameter.

In a fourth aspect of the present invention, the control apparatus for an internal combustion engine according to claim 3, further comprising correction execution determination means that corrects the wall-surface fuel adherence amount by means of the WGV correspondence correction means only in a case where a demand arises to change the degree of opening of the waste gate valve by an amount that is greater than a predetermined value.

In a fifth aspect of the present invention, The control apparatus for an internal combustion engine according to any one of claims 1 to 4, further comprising:
an intake air pressure sensor that detects an intake air pressure at a position that is on an upstream side of a throttle valve that adjusts an intake air amount of the internal combustion engine and on a downstream side of the compressor of the supercharger;
wherein the fuel adherence amount calculation means uses an output of the intake air pressure sensor as the WGV parameter.

Advantageous Effects of Invention

According to the first invention, a wall-surface fuel adherence amount can be calculated based on a degree of opening of a WGV and the like, and the calculation value can be accurately changed in a manner that tracks the actual amount of fuel adhering to a wall surface. Further, fuel injection control can be executed that is based on a fuel injection amount in which the wall-surface fuel adherence amount is reflected. Thus, even when executing WGV control, the state of a blowback amount of exhaust gas that changes together with changes in the degree of opening of the WGV can be reflected in the wall-surface fuel adherence amount, in other words, the fuel injection amount, and a disturbance or the like of the air-fuel ratio that is caused by changes in the blowback amount can be suppressed. Accordingly, the air-fuel ratio can be stably controlled in a manner that takes into consideration changes in the blowback amount of exhaust gas caused by WGV control.

According to the second invention, fuel adherence amount calculation means can increase a calculation value for a wall-surface fuel adherence amount in accordance with an increase in a degree of opening of the WGV. More specifically, as the degree of opening of the WGV increases, the supercharging pressure falls and the flow rate of intake air decreases and therefore injected fuel is more liable to adhere to a wall surface. Hence, the wall-surface fuel adherence amount can be appropriately calculated based on this characteristic.

According to the third invention, base calculation means can calculate the wall-surface fuel adherence amount based on at least one parameter among parameters that include a number of engine revolutions, a load, an engine temperature, and an amount of change in the load, and WGV correspondence correction means can correct the wall-surface fuel adherence amount based on a WGV parameter. Accordingly, changes in the respective parameters described above can all be reflected in the actual fuel injection amount, and the injection amount can be appropriately controlled in accordance with the respective parameters.

According to the fourth invention, only when a demand arises to change the degree of opening of the WGV to a value that is greater than a predetermined value, correction execution determination means can correct the wall-surface fuel adherence amount by means of the WGV correspondence correction means. More specifically, when the demand has not arisen, correction of the wall-surface fuel adherence amount based on the degree of opening of the WGV can be stopped. Therefore, since it is possible to carry out precise correction of the wall-surface fuel adherence amount only in a case where the degree of opening of the WGV changes suddenly and correction is required, a situation in which the wall-surface fuel adherence amount is excessively corrected as the result of just a small change in the degree of opening of the WGV can be avoided. Accordingly, variations and the like in the wall-surface fuel adherence amount can be suppressed, and control can be stabilized.

According to the fifth invention, the fuel adherence amount calculation means can correct the wall-surface fuel adherence amount based on an output (supercharging pressure) of an intake air pressure sensor as a WGV parameter. It is thereby possible to suppress detection errors relating to the degree of opening of the WGV that are caused by changes in the temperature of the exhaust system and the like, and thus improve the accuracy of correcting the wall-surface fuel adherence amount.

BRIEF DESCRIPTION OF DRAWINGS

FIG. 2 is a characteristics diagram that illustrates a state of changes in a supercharging pressure between a time when a WGV valve is open and a time when the WGV valve is closed.

FIG. 3 is a characteristics diagram that illustrates a state of changes in a peak value of an exhaust pulse and the like between a time when a WGV valve is open and a time when the WGV valve is closed.

DESCRIPTION OF EMBODIMENT

Embodiment 1

Configuration of Embodiment 1

Figure 1:
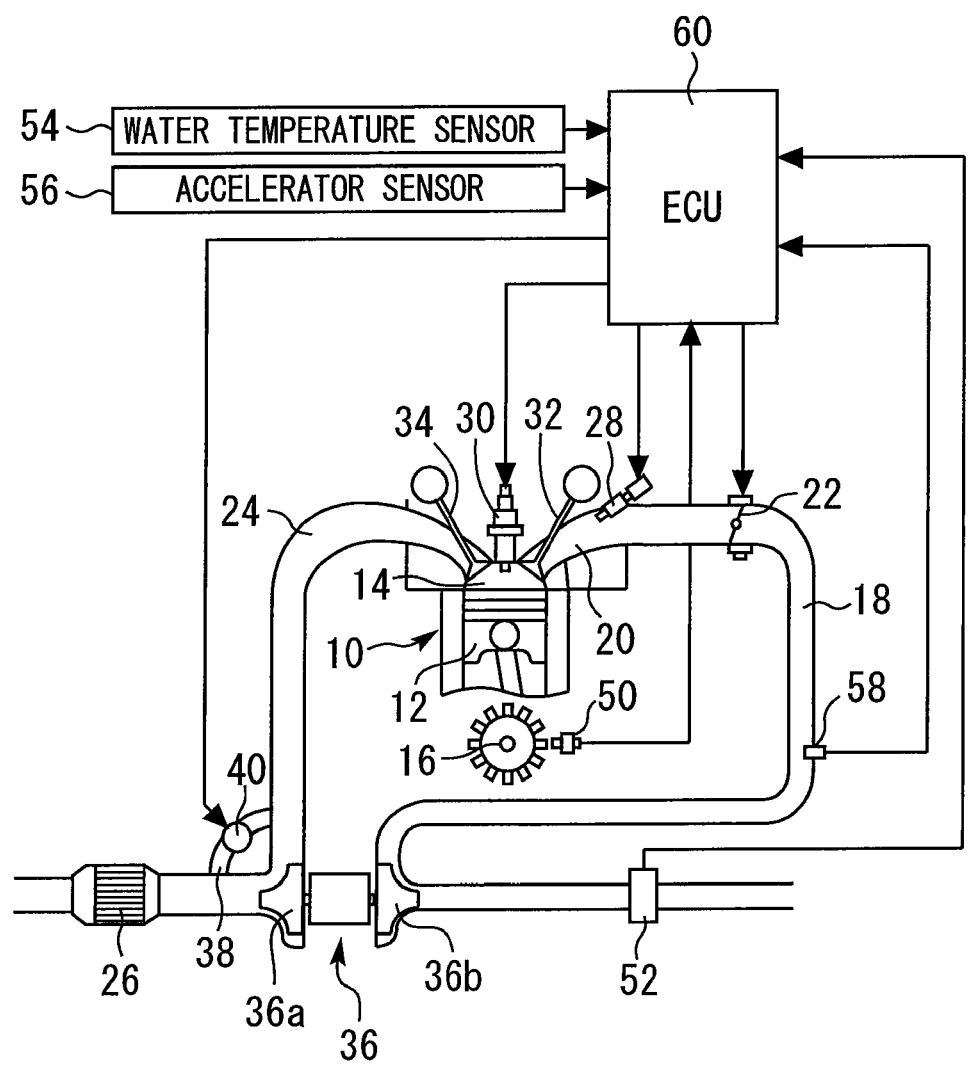
FIG. 1 is an overall configuration diagram for describing the system configuration of Embodiment 1 of the present invention.

Hereunder, Embodiment 1 of the present invention is described while referring to FIGS. 1 to 12. FIG. 1 is an overall configuration diagram for describing the system configuration of Embodiment 1 of the present invention. The system of the present embodiment includes an engine 10 as a multi-cylinder internal combustion engine. In this connection, only one cylinder among a plurality of cylinders provided in the engine 10 is exemplified in FIG. 1. In each cylinder of the engine 10, a combustion chamber 14 is formed by a piston 12, and the piston 12 is connected to a crankshaft 16 of the engine.

The engine 10 includes an intake passage 18 that draws intake air into each cylinder. An intake port 20 that opens inside the combustion chamber 14 (inside the cylinder) of each cylinder is provided on the downstream side of the intake passage 18. An electronically controlled throttle valve 22 that adjusts an intake air amount is also provided in the intake passage 18. The engine 10 also includes an exhaust passage 24 through which exhaust gas is discharged from each cylinder. A catalyst 26 such as a three way catalyst that purifies exhaust gas is provided in the exhaust passage 24. Each cylinder is provided with a fuel injection valve 28 that injects fuel into intake air inside the intake port 20, a spark plug 30 that ignites an air-fuel mixture in the cylinder, an intake valve 32 that opens and closes the intake port 20, and an exhaust valve 34 that opens and closes an exhaust port.

The engine 10 also includes a known supercharger 36 that supercharges intake air utilizing an exhaust pressure. The supercharger 36 is constituted by a turbine 36a that is provided in the exhaust passage 24 on an upstream side of the catalyst 26, and a compressor 36b provided in the intake passage 18. When the supercharger 36 operates, the turbine 36a receives an exhaust pressure and drives the compressor 36b, and as a result intake air is supercharged by the compressor 36b. A bypass passage 38 that bypasses the turbine 36a, and a waste gate valve (WGV) 40 that adjusts the amount of exhaust gas flowing through the bypass passage 38 are also provided in the exhaust passage 24. The bypass passage 38 branches from the exhaust passage 24 on the upstream side of the turbine 36a, and merges with the exhaust passage 24 at a position that is on the downstream side of the turbine 36a and the upstream side of the catalyst 26.

Next, a control system of the engine will be described. The system according to the present embodiment includes a sensor system that includes sensors 50 to 58, and an ECU (Electronic Control Unit) 60 that controls the operating state of the engine 10. First, the sensor system will be described. A crank angle sensor 50 detects a signal that is synchronous with rotation of a crankshaft 16. An airflow sensor 52 detects an intake air amount of the engine. A water temperature sensor 54 detects a temperature of the engine cooling water (engine water temperature), as one example of an engine temperature of the engine. Note that, according to the present embodiment, for example, a temperature of the engine body or an oil temperature of lubricating oil or the like may also be used as an engine temperature.

Further, an accelerator sensor 56 detects an accelerator operation amount (degree of accelerator opening) of a driver, and an intake air pressure sensor 58 detects an intake air pressure (supercharging pressure) of the engine. The intake air pressure sensor 58 is provided in the intake passage 18 at a position that is on the upstream side of the throttle valve 22 and the downstream side of the compressor 36b of the supercharger 36. In addition to these sensors, the sensor system includes various sensors that are required to control the engine (such as an air-fuel ratio sensor that detects an exhaust air-fuel ratio on the upstream side of the catalyst 26), and each sensor is connected to an input side of the ECU 60. Further, various actuators including the throttle valve 22, the fuel injection valve 28, the spark plug 30, and the WGV 40 are connected to an output side of the ECU 60.

The ECU 60 is constituted, for example, by an arithmetic processing apparatus that includes a storage circuit such as a ROM, a RAM, or a non-volatile memory, and an input/output port. The ECU 60 controls the operation of the engine by driving each actuator based on information regarding the operation of the engine that is detected by the sensor system. More specifically, the ECU 60 detects the number of engine revolutions and the crank angle based on an output of the crank angle sensor 50, and calculates a load (load factor) of the engine based on an intake air amount detected by the airflow sensor 52 and the number of engine revolutions.

The ECU 60 also executes fuel injection control that calculates a fuel injection amount (base fuel injection amount) based on the number of engine revolutions, the load factor, the warming-up state of the engine, and the existence or nonexistence of an acceleration operation and the like, as well as ignition timing control that calculates an ignition timing based on the crank angle and the like. For each cylinder, the ECU 60 drives the fuel injection valve 28 at a time point at which a fuel injection timing has been reached, and drives the spark plug 30 at a time point at which an ignition timing has been reached. Thus, an air-fuel mixture inside each cylinder can be combusted to operate the engine 10. Further, the ECU 60 executes air-fuel ratio control that corrects a fuel injection amount so that an exhaust air-fuel ratio matches a target air-fuel ratio based on an output of an air-fuel ratio sensor or the like, and WGV control that changes the degree to which the WGV 40 is open (degree of opening of the WGV) based on an output of the intake air pressure sensor 58 and the like. Note that the aforementioned fuel injection control, ignition timing control, air-fuel ratio control, and WGV control are all known types of control.

Features of Embodiment 1

Generally, a portion of fuel injected into the intake port 20 adheres to a wall surface of the intake port 20 or the intake valve 32 or the like. This phenomenon is a variable factor with respect to the amount of fuel (air-fuel ratio) that flows into the relevant cylinder. In particular, when the degree of opening of the WGV changes, as shown in FIG. 2, the exhaust pressure and the supercharging pressure change, and as shown in FIG. 3, a peak value of an exhaust pulse and the like changes. When the state of the exhaust pressure changes in this manner, a blowback amount of exhaust gas that flows back to the intake port 20 changes, and since the amount of fuel adhering to the wall surface of the intake port 20 (hereunder, referred to as "wall-surface fuel adherence amount") changes in accompaniment therewith, the air-fuel ratio is liable to be disturbed. Therefore, a feature of the present embodiment is that WGV correspondence control, which is described below, is executed. In this connection, FIG. 2 is a characteristics diagram that illustrates a state of changes in a supercharging pressure between a time when a WGV valve is open and a time when the WGV valve is closed. FIG. 3 is a characteristics diagram that illustrates a state of changes in a peak value of an exhaust pulse and the like between a time when a WGV valve is open and a time when the WGV valve is closed.

(WGV Correspondence Control)

According to this control, the degree of opening of the WGV or an indicator corresponding to the degree of opening is acquired as a WGV parameter, and a wall-surface fuel adherence amount is calculated based on at least the WGV parameter. Further, the wall-surface fuel adherence amount is reflected in a fuel injection amount that is set by the above described fuel injection control. More specifically, according to the WGV correspondence control, first, a base wall-surface adherence amount FMWB that serves as a basis for a wall-surface fuel adherence amount FMW is calculated. A characteristic of the wall-surface fuel adherence amount that changes in accordance with the number of engine revolutions and the load factor is reflected in the base wall-surface adherence amount FMWB.

(Calculation of Base Wall-Surface Adherence Amount FMWB)

Figure 4:
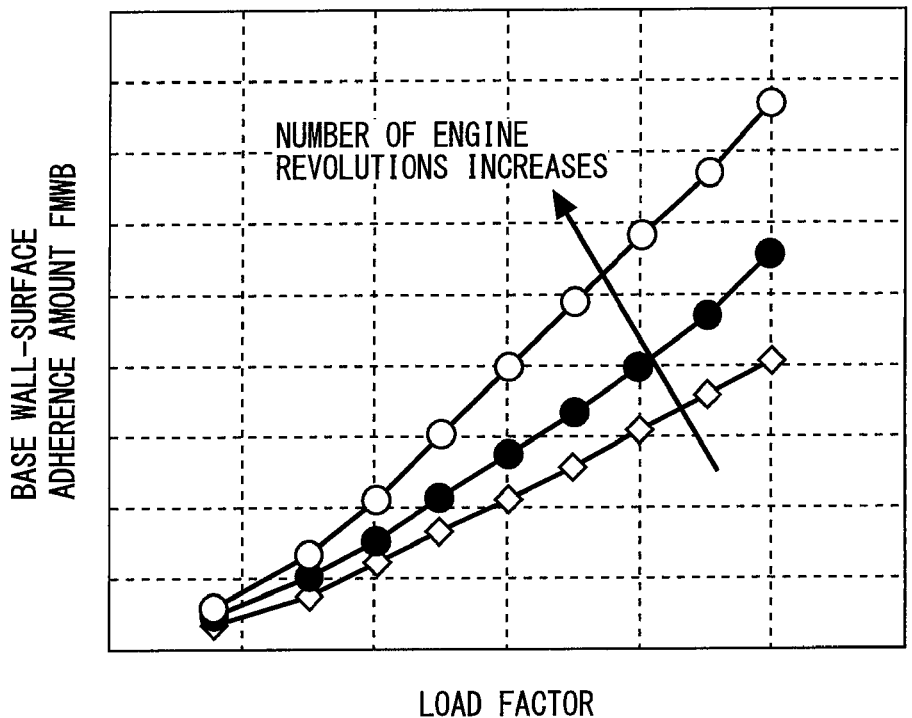
FIG. 4 is a characteristics diagram that illustrates a characteristic of the wall-surface fuel adherence amount with respect to the number of engine revolutions and the load factor.
Figure 5:
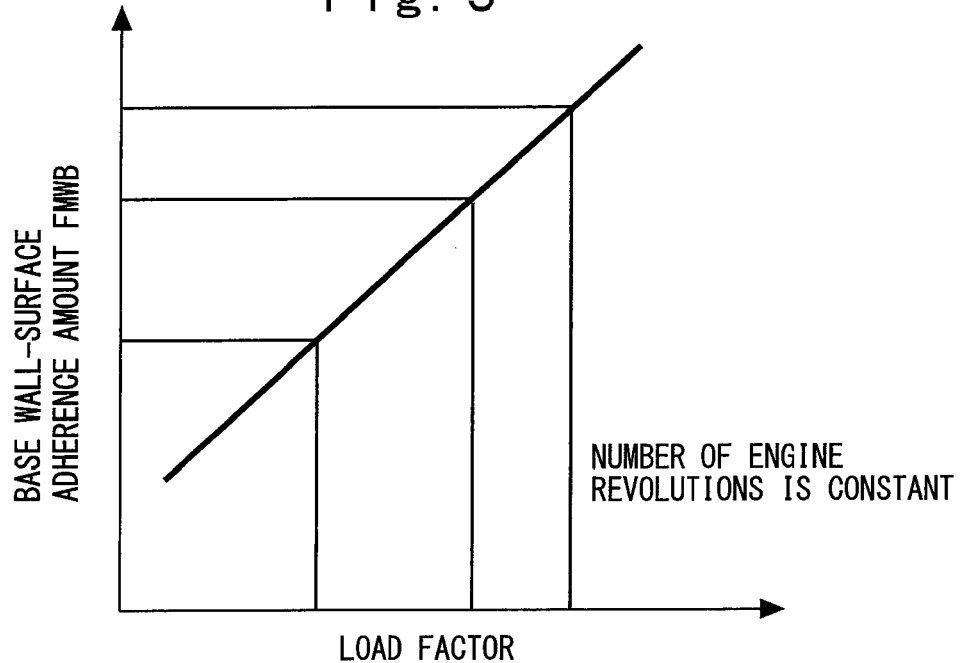
FIG. 5 shows characteristics data that illustrates the relationship between the load factor and the base wall-surface adherence amount when the number of engine revolutions is taken as being constant.

FIG. 4 is a characteristics diagram that illustrates a characteristic of the wall-surface fuel adherence amount with respect to the number of engine revolutions and the load factor. As shown in FIG. 4, the wall-surface fuel adherence amount has a characteristic such that the wall-surface fuel adherence amount increases in accordance with an increase in the number of engine revolutions or an increase in the load factor. A two-dimensional data map that has been set based on this characteristic is previously stored in the ECU 60. FIG. 5 shows characteristics data that illustrates the relationship between the load factor and the base wall-surface adherence amount when the number of engine revolutions is taken as being constant. The characteristics data shown in FIG. 5 constitutes a part of the two-dimensional data map. More specifically, the characteristics data shown in FIG. 5 is stored for each different number of engine revolutions in the ECU 60.

Accordingly, the ECU 60 can calculate the base wall-surface adherence amount FMWB by referring to the two-dimensional data map based on the number of engine revolutions and the load factor. In this connection, the base wall-surface adherence amount FMWB is set as a reference value for a state in which warming-up of the engine is completed. Further, according to the present embodiment, a final wall-surface fuel adherence amount FMW is calculated by correcting the thus-calculated base wall-surface adherence amount FMWB using a WGV correction coefficient Kv, a water temperature correction coefficient Kt, a load factor change correction coefficient Kdl and the like that are described below.

(Calculation of WGV Correction Coefficient Kv)

Figure 6:
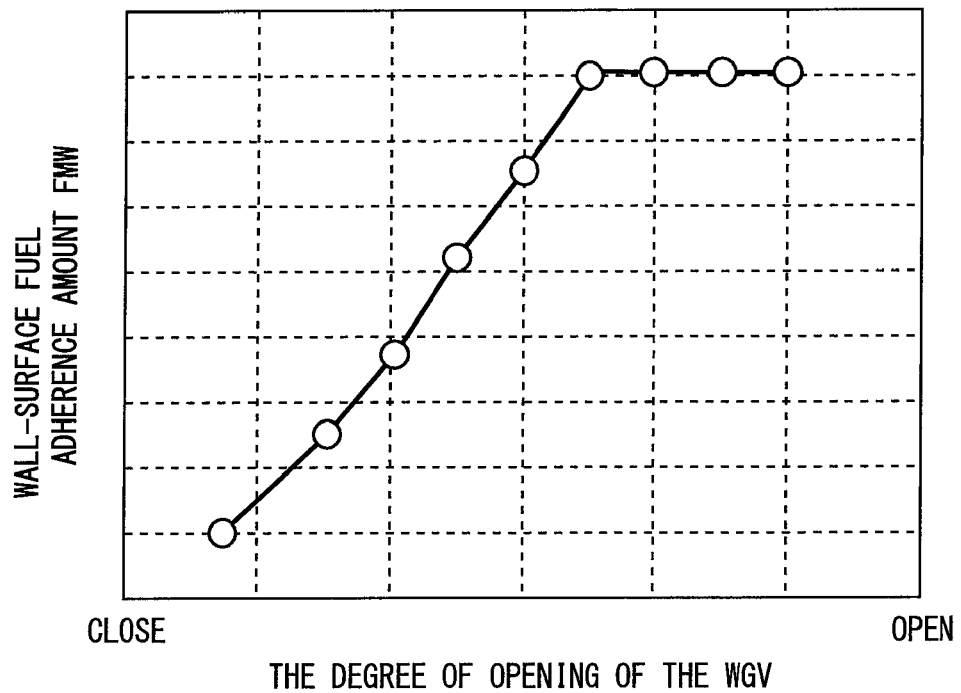
FIG. 6 illustrates a characteristic of the wall-surface fuel adherence amount with respect to changes in the degree of opening of the WGV.

The WGV correction coefficient Kv is a correction coefficient for correcting the base wall-surface adherence amount FMWB based on the degree of opening of the WGV. FIG. 6 illustrates a characteristic of the wall-surface fuel adherence amount with respect to changes in the degree of opening of the WGV. As shown in FIG. 6, the wall-surface fuel adherence amount has a characteristic such that the wall-surface fuel adherence amount increases as the degree of opening of the WGV increases, that is, as the supercharging pressure decreases. This characteristic arises from the fact that, as the degree of opening of the WGV increases, the supercharging pressure falls and the flow rate of intake air decreases and therefore injected fuel is liable to adhere to a wall surface. The above described characteristic is previously stored in the ECU 60 as, for example, a data map that represents the relationship between the degree of opening of the WGV and the WGV correction coefficient Kv. The ECU 60 calculates the WGV correction coefficient Kv which has the characteristic of increasing as the degree of opening of the WGV increases, by referring to the data map based on the degree of opening of the WGV. Accordingly, the wall-surface fuel adherence amount FMW can be appropriately calculated based on the characteristic with respect to the degree of opening of the WGV.

In this connection, known methods for detecting the degree of opening of the WGV include, for example, a method that directly detects the degree of opening of the WGV 40 using a degree of opening sensor or the like, and a method that detects the degree of opening of the WGV based on an output of an exhaust pressure sensor or an exhaust temperature sensor that is disposed in the vicinity of an outlet of the WGV 40. Further, a method that uses a target value for the degree of opening of the WGV 40 that is set by the above described WGV control as the degree of opening of the WGV, or, for example as described in Japanese Patent Laid-Open No. 2010-185302, a method that uses a size of a negative pressure supplied to a negative pressure actuator that drives the WGV 40 as the degree of opening of the WGV may also be used.

Although according to the present embodiment a case is exemplified in which the WGV correction coefficient Kv is calculated based on the degree of opening of the WGV, the present invention is not limited thereto, and various kinds of indicators that correspond to the degree of opening of the WGV may be acquired as a WGV parameter, and the WGV correction coefficient Kv may be calculated based on the indicators. Examples of such indicators include the aforementioned output of an exhaust pressure sensor or exhaust temperature sensor, the size of a negative pressure supplied to a negative pressure actuator, and an output (supercharging pressure) of the intake air pressure sensor 58.

Figure 7:
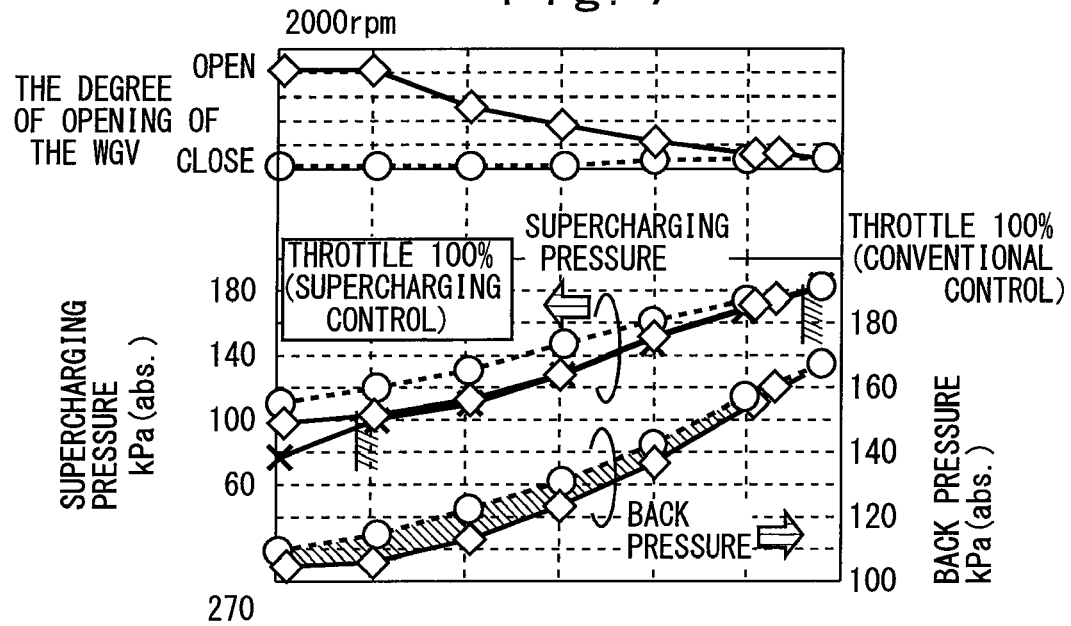
FIG. 7 is a characteristics diagram that illustrates an example of the relationship between the degree of opening of the WGV and the supercharging pressure.

In particular, when the WGV correction coefficient Kv is calculated based on the supercharging pressure instead of the degree of opening of the WGV, it is possible to suppress detection errors for the degree of opening of the WGV that are caused by temperature changes in the exhaust system or the like, and thereby improve the accuracy of calculating the WGV correction coefficient Kv (wall-surface fuel adherence amount FMW). In this case, as shown in FIG. 7, there is a characteristic such that an absolute value (abs.) of the supercharging pressure on an outlet side of the compressor 36$b$ decreases as the degree of opening of the WGV increases. Accordingly, the characteristic of the WGV correction coefficient Kv may be set so that the calculation value of the wall-surface fuel adherence amount FMW increases as the supercharging pressure decreases. In this connection, FIG. 7 is a characteristics diagram that illustrates an example of the relationship between the degree of opening of the WGV and the supercharging pressure. More specifically, the relationship between the degree of opening of the WGV and the supercharging pressure also changes depending on the intake air amount (or degree of throttle opening). Accordingly, a configuration may be adopted which calculates the WGV correction coefficient Kv based on the supercharging pressure and the intake air amount. According to this configuration, the accuracy of calculating the WGV correction coefficient Kv can be further improved.

(Calculation of Water Temperature Correction Coefficient Kt)

Figure 8:
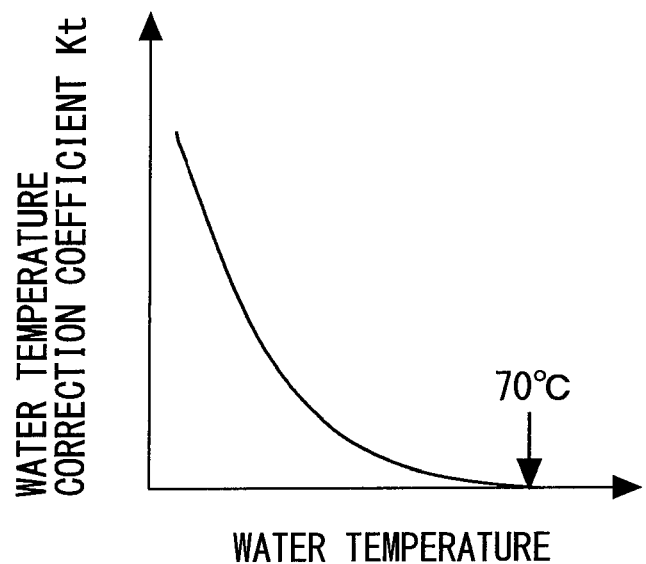
FIG. 8 is a characteristics diagram that illustrates the relationship between the engine water temperature and the water temperature correction coefficient.

The water temperature correction coefficient Kt is a correction coefficient for correcting the base wall-surface adherence amount FMWB based on the engine water temperature. FIG. 8 is a characteristics diagram that illustrates the relationship between the engine water temperature and the water temperature correction coefficient. The characteristic illustrated in FIG. 8 is previously stored in the ECU 60 as a data map. The ECU 60 can refer to the data map based on the engine water temperature, and calculate the water temperature correction coefficient Kt. In this case, there is a characteristic such that the wall-surface fuel adherence amount decreases when an engine temperature such as the engine water temperature rises, because it is easier for injected fuel to evaporate. This characteristic is reflected in the data illustrated in FIG. 8, in which the water temperature correction coefficient Kt decreases as the engine water temperature rises, and for example, the water temperature correction coefficient Kt is set to zero in a completely warmed-up state in which the engine water temperature ≥70° C.

(Calculation of Load Factor Change Correction Coefficient Kdl)

Figure 9:
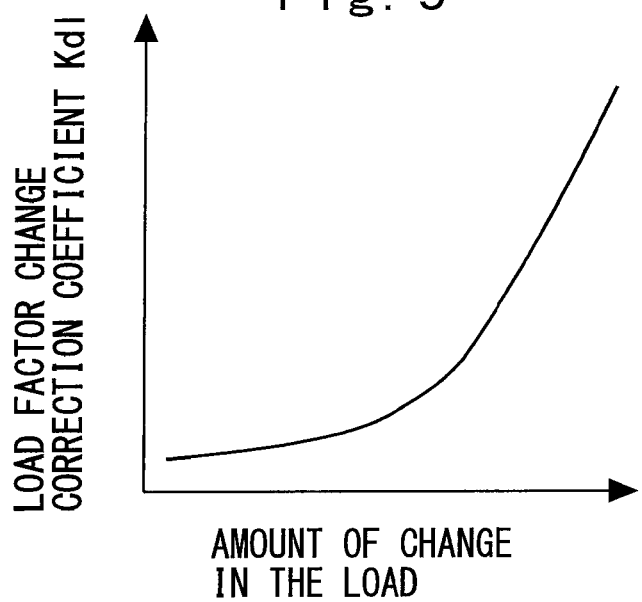
FIG. 9 is a characteristics diagram that illustrates the relationship between the amount of change in the load factor and the load factor change correction coefficient.

The load factor change correction coefficient Kdl is a correction coefficient for correcting the base wall-surface adherence amount FMWB based on the amount of change in the load factor. In this connection, the term "amount of change in the load factor" is defined as, for example, a differential value obtained by subtracting a load factor target value that is set based on the degree of accelerator opening or the like from the current load factor. FIG. 9 is a characteristics diagram that illustrates the relationship between the amount of change in the load factor and the load factor change correction coefficient. The characteristic illustrated in FIG. 9 is previously stored in the ECU 60 as a data map. When the load factor of the engine changes by a large amount, the wall-surface fuel adherence amount also changes by a large amount, and hence it is necessary to correct the base wall-surface adherence amount FMWB by a large amount. This point is reflected in the data illustrated in FIG. 9, in which the load factor change correction coefficient Kdl is set so as to increase as the amount of change in the load factor increases. The ECU 60 calculates the amount of change in the load factor, and can calculate the load factor change correction coefficient Kdl by referring to the data map based on the amount of change.

(Calculation of Wall-Surface Fuel Adherence Amount FMW)

In the next processing, the ECU 60 calculates the final wall-surface fuel adherence amount FMW by means of the following equation (1) based on the base wall-surface adherence amount FMWB, the WGV correction coefficient Kv, the water temperature correction coefficient Kt, and the load factor change correction coefficient Kdl that are determined by the above described methods.

$$FMW = FMWB \times Kv \times Kt \times Kdl + FMW_{previous} \times (1-QTRN) \quad (1)$$

Figure 10:
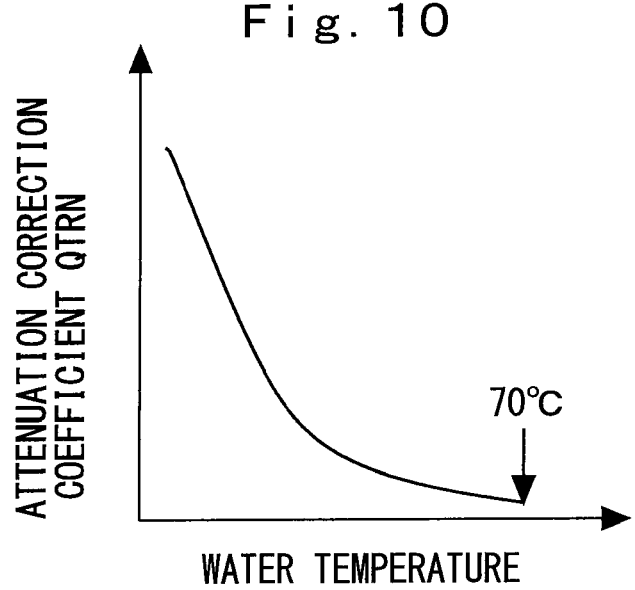
FIG. 10 is a characteristics diagram for setting the attenuation correction coefficient QTRN based on the engine water temperature.

In the above equation (1), $FMW_{previous}$ is the FMW value (previous value) that was calculated in the previous arithmetic cycle. Further, QTRN is an attenuation correction coefficient that adjusts the degree to which the previous value is reflected in the newest value of the wall-surface fuel adherence amount FMW. The attenuation correction coefficient QTRN is set on the basis of the engine water temperature. FIG. 10 is a characteristics diagram for setting the attenuation correction coefficient QTRN based on the engine water temperature. The characteristic shown in FIG. 10 is previously stored in the ECU 60 as a data map. As shown in FIG. 10, the attenuation correction coefficient QTRN decreases as the engine water temperature increases, and is set to zero in a completely warmed-up state. Accordingly, the wall-surface fuel adherence amount FMW is set so as to change with a high responsiveness when the engine is cold, and to change gradually as the engine temperature approaches a warmed-up state.

(Reflection to Fuel Injection Amount)

According to the next processing, a final fuel injection amount ETAUout is calculated by means of the following equation (2) based on a base fuel injection amount ETAUbase that is set by the aforementioned fuel injection control, an air-fuel ratio correction amount FAF that is set by the aforementioned air-fuel ratio control, and the wall-surface fuel adherence amount FMW.

$$ETAUout = ETAUbase + FMW + FAF \quad (2)$$

Thus, according to the WGV correspondence control, the wall-surface fuel adherence amount FMW is calculated based on a plurality of parameters that include the WGV parameter that is the degree of opening of the WGV or an indicator corresponding to the degree of opening, the number of engine revolutions, the load factor that reflects the intake air amount, the engine temperature (engine water temperature), and the amount of change in the load factor. The thus-calculated wall-surface fuel adherence amount FMW is reflected in the final fuel injection amount ETAUout, and fuel of an amount corresponding to the fuel injection amount ETAUout is injected from the fuel injection valve 28. Accordingly, changes in the respective parameters described above can all be reflected in the actual fuel injection amount, and the injection amount can be appropriately controlled in accordance with the individual parameters.

According to the present embodiment a case was exemplified in which the wall-surface fuel adherence amount FMW is calculated based on the plurality of parameters described above. However, according to the present invention, with the exception of the WGV parameter, it is not necessary to use all of the parameters. More specifically, according to the present invention, at least one parameter among the group consisting of the number of engine revolutions, the load factor, the engine temperature, and the amount of change in the load factor may be selected as necessary, and the wall-surface fuel adherence amount FMW may be calculated based on the selected parameter and the WGV parameter.

(Condition for Executing Correction According to Degree of Opening of WGV)

According to the above description, the wall-surface fuel adherence amount FMW is corrected based on the WGV correction coefficient Kv and the like. In this case, a configuration may be adopted that executes processing to correct the wall-surface fuel adherence amount FMW by means of the WGV parameter continuously during operation of the engine, or a configuration may be adopted that only executes such processing when a demand (sudden change demand) arises to suddenly change the degree of opening of the WGV due to WGV control. More specifically, according to the present invention, a configuration may be adopted such that, when a sudden change demand with respect to the degree of opening of the WGV arises, the WGV correction coefficient Kv is calculated by the above described calculation method, and when a sudden change demand does not arise, the wall-surface fuel adherence amount FMW is calculated without executing correction by means of the WGV correction coefficient Kv (or by taking the WGV correction coefficient Kv as being equal to 1).

Here, the term "sudden change demand with respect to the degree of opening of the WGV" refers to a demand that arises, for example, at a time of acceleration or deceleration, when it is necessary to (rapidly) change the degree of opening of the WGV by an amount that is greater than a predetermined value. The predetermined value is appropriately set in accordance with, for example, a difference in the degree of opening between when the WGV is fully open and when the WGV is fully closed or the like. Therefore, for example, when an amount of change in the degree of opening of the WGV that is controlled by WGV control has become greater than or equal to the predetermined value, the ECU 60 determines that a sudden change demand has arisen. Further, according to the present invention, it may also be determined that a sudden change demand with respect to the degree of opening of the WGV has arisen when the degree of opening of the WGV changes from fully open to fully closed (or from fully closed to fully open).

According to this configuration, it is possible to precisely correct the wall-surface fuel adherence amount FMW based on the WGV parameter only when the degree of opening of the WGV changes suddenly and correction is necessary. More specifically, a situation in which the wall-surface fuel adherence amount FMW is excessively corrected when the degree of opening of the WGV has changed by just a small amount can be avoided. Accordingly, it is possible to suppress variations in the wall-surface fuel adherence amount FMW and the like, and thereby stabilize control.

Operation and Effects of Embodiment 1

Figure 11:
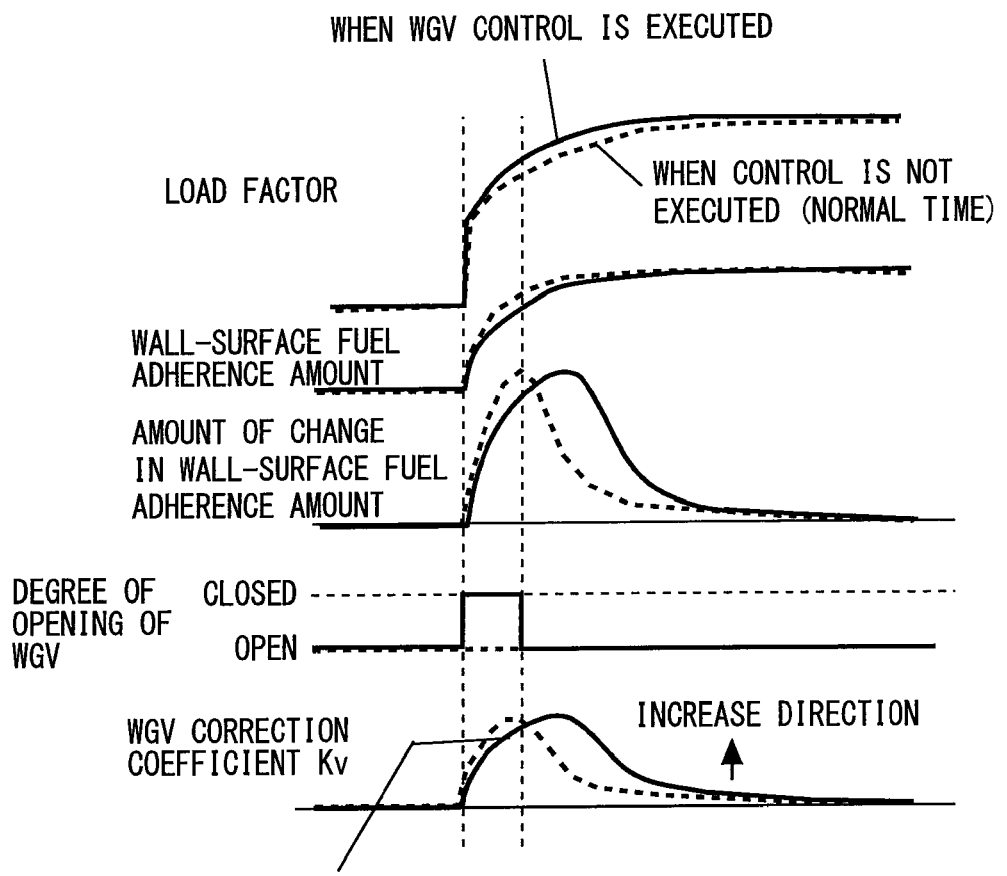
FIG. 11 is a timing chart that illustrates the state of the wall-surface fuel adherence amount and the WGV correction coefficient and the like when the degree of opening of the WGV suddenly changes.

Next, the operation and effects of the present embodiment are described with reference to FIG. 11. FIG. 11 is a timing chart that illustrates the state of the wall-surface fuel adherence amount and the WGV correction coefficient and the like when the degree of opening of the WGV suddenly changes. The solid lines in FIG. 11 represent a case where, for example, the WGV is changed suddenly from a fully open state to a fully closed state by WGV control when accelerating. The dashed lines in FIG. 11 represent a case where the same WGV control is not executed.

First, when an accelerator operation such as a sudden acceleration is performed, the wall-surface fuel adherence amount temporarily increases accompanying an increase in the load factor. However, when the WGV is abruptly closed by the WGV control, the supercharging pressure and intake air temperature increase, and hence the vaporization amount of fuel adhering to a wall surface increases and the wall-surface fuel adherence amount starts to decrease. At this time, according to the WGV correspondence control, as shown in the lowermost part of FIG. 11, although initially the WGV correction coefficient Kv is increased in accordance with the increase in the load factor, as the supercharging pressure and intake air temperature increase, the WGV correction coefficient Kv is decreased in correspondence therewith.

As described above, according to the present embodiment, the WGV correction coefficient Kv is calculated based on the degree of opening of the WGV, and the wall-surface fuel adherence amount FMW that is calculated based on the WGV correction coefficient Kv and the like can be accurately changed in a manner that tracks the actual wall-surface fuel adherence amount. Further, fuel injection control can be executed that is based on the fuel injection amount ETAUout in which the wall-surface fuel adherence amount FMW is reflected. Thus, even in a case where WGV control is executed, the state of a blowback amount of exhaust gas that varies with the degree of opening of the WGV can be reflected in the wall-surface fuel adherence amount FMW, in other words, the fuel injection amount ETAUout, and a disturbance of the air-fuel ratio or the like caused by changes in the blowback amount can be suppressed. Accordingly, the air-fuel ratio can be stably controlled in a manner that takes into account changes in the blowback amount of exhaust gas caused by WGV control.

Specific Processing to Realize Embodiment 1

Figure 12:
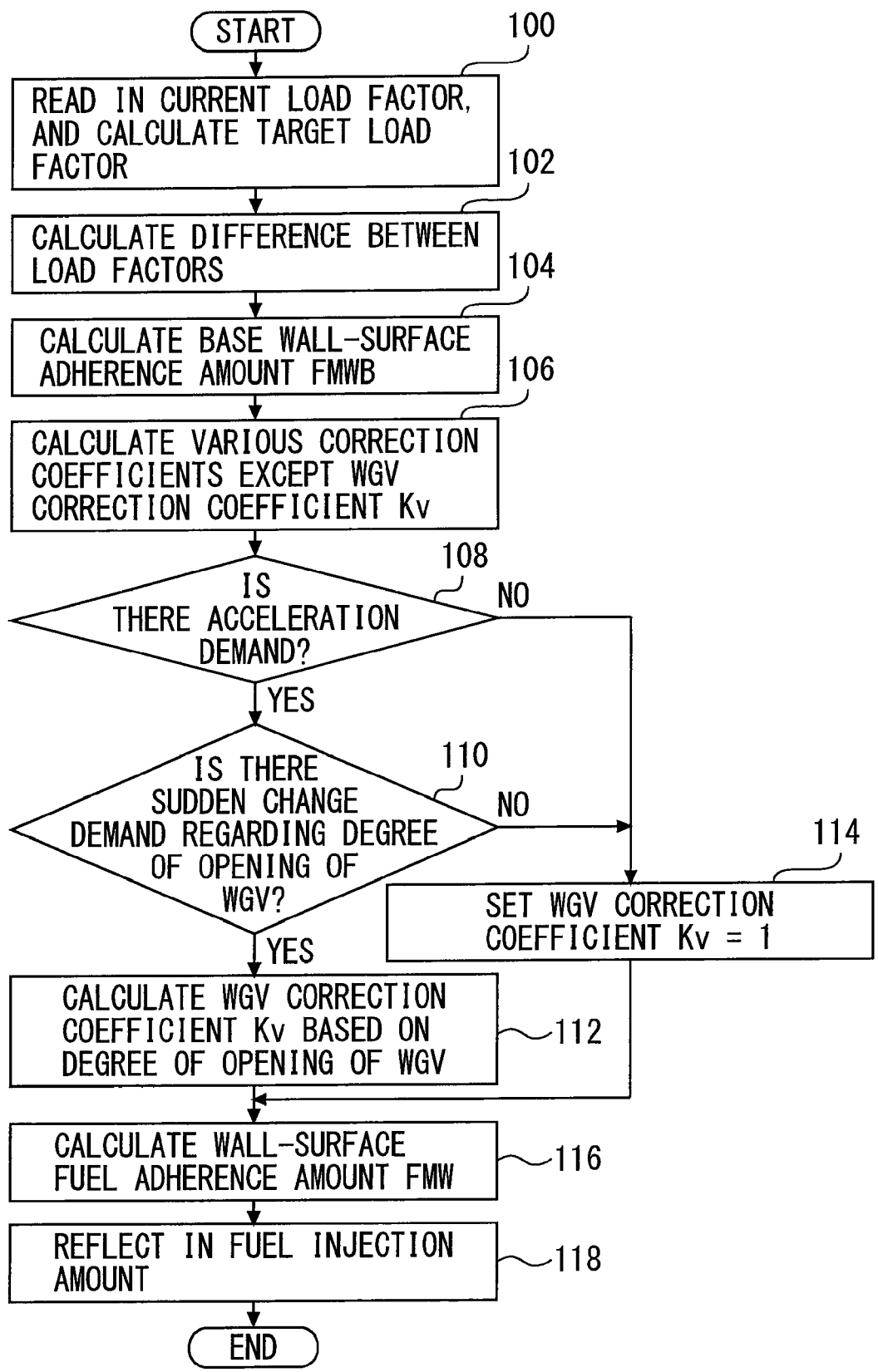
FIG. 12 is a flowchart that illustrates control executed by the ECU according to Embodiment 1 of the present invention.

Next, specific processing to realize the above described control is described referring to FIG. 12. FIG. 12 is a flowchart that illustrates control executed by the ECU according to Embodiment 1 of the present invention. The routine shown in FIG. 12 is repeatedly executed during operation of the engine. According to the routine shown in FIG. 12, first, in step 100, the current load factor is read in and a target load factor is set based on the degree of accelerator opening and the like. Next, in step 102, the ECU 60 calculates a difference (amount of change) between the current load factor and the target load factor. Subsequently, in step 104, the ECU 60 calculates the base wall-surface adherence amount FMWB by the above described method. Thereafter, in step 106, the ECU 60 calculates the respective correction coefficients (water temperature correction coefficient Kt, load factor change correction coefficient Kdl, and attenuation correction coefficient QTRN and the like) other than the WGV correction coefficient Kv.

Subsequently, in step 108, the ECU 60 determines whether or not there is an acceleration demand by comparing the current load factor and the target load factor. More specifically, when the target load factor is greater than the current load factor, the ECU 60 determines that an acceleration demand has arisen. Further, in step 110, the ECU 60 determines whether or not a sudden change demand with respect to the degree of opening of the WGV, as described above, has arisen as a result of the acceleration demand. As a specific example, in step 110, for example, the ECU 60 determines whether or not there is a demand to suddenly change the degree of opening of the WGV from fully open to fully closed. If the results determined in steps 108 and 110 are both affirmative, the ECU 60 determines that a sudden change demand with respect to the degree of opening of the WGV has arisen as the time of acceleration. Therefore, in the subsequent step 112, the ECU 60 calculates the WGV correction coefficient Kv based on the degree of opening of the WGV by the above described calculation method.

In contrast, if either of the results determined in steps 108 and 110 is negative, for example, since an extreme, sudden acceleration is not being performed, the ECU 60 determines that processing to correct the wall-surface fuel adherence amount FMW by means of the WGV correction coefficient Kv is unnecessary. In this case, in step 114, the ECU 60 sets the WGV correction coefficient Kv to a state in which the WGV correction coefficient Kv is not involved in correction (Kv=1).

Next, in step 116, the ECU 60 calculates the wall-surface fuel adherence amount FMW using the above described equation (1) based on the base wall-surface adherence amount FMWB and the respective correction coefficients Kv, Kt, Kdl, and QTRN. Thereafter, in step 118, based on the above described equation (2), the ECU 60 causes the calculated wall-surface fuel adherence amount FMW to be reflected in the fuel injection amount ETAUout, and ends the present routine.

Note that, in the above described Embodiment 1, steps 104, 106, 112, 114, and 116 in FIG. 12 show specific examples of fuel adherence amount calculation means according to claims 1 to 4. Of these, steps 104 and 106 show specific examples of base calculation means according to claim 3, and step 112 shows a specific example of WGV correspondence correction means. Further, step 118 shows a specific example of fuel adherence amount reflecting means according to claim 1, and steps 108 and 110 show specific examples of correction execution determination means according to claim 4.

Further, although an example of an intake-port fuel injection type engine 10 is described above according to Embodiment 1, the present invention is not limited to an intake-port fuel-injection type internal combustion engine. More specifically, the present invention may also be applied to an in-cylinder fuel-injection type internal combustion engine in which fuel is injected directly into a cylinder by a fuel injection valve. In this case, the amount of injected fuel adhering to a wall surface inside a cylinder may be calculated as a wall-surface fuel adherence amount by a method that is substantially the same as the method according to Embodiment 1.

DESCRIPTION OF REFERENCE NUMERALS 10 engine, 12 piston, 14 combustion chamber, 16 crankshaft, 18 intake passage, 20 intake port, 22 throttle valve, 24 exhaust passage, 26 catalyst, 28 fuel injection valve, 30 spark plug, 32 intake valve, 34 exhaust valve, 36 supercharger, 36a turbine, 36b compressor, 38 bypass passage, 40 waste gate valve, 50 crank angle sensor, 52 airflow sensor, 54 water temperature sensor, 56 accelerator sensor, 58 intake air pressure sensor, 60 ECU

The invention claimed is:
1. A control apparatus for an internal combustion engine, comprising:
a fuel injection valve that injects a fuel into intake air of the internal combustion engine;
a supercharger that has a turbine provided in an exhaust passage and a compressor provided in an intake passage of the internal combustion engine, and that supercharges intake air utilizing an exhaust pressure;

a waste gate valve that adjusts an amount of exhaust gas that flows by bypassing the turbine of the supercharger;

characteristics data that shows a relationship between a wall-surface fuel adherence amount that is an amount of fuel adhering to a wall surface of the internal combustion engine among the fuel injected from the fuel injection valve and a WGV parameter that is a degree of opening of the waste gate valve or an indicator corresponding to the degree of opening;

a fuel adherence amount calculation device that acquires the WGV parameter and calculates the wall-surface fuel adherence amount from the characteristics data based on at least the WGV parameter; and a fuel adherence amount reflecting device that adds the wall-surface fuel adherence amount to a fuel injection amount that is set based on an operating state of the internal combustion engine.

2. The control apparatus for an internal combustion engine according to claim 1, wherein the fuel adherence amount calculation device is programmed to increase a calculation value of the wall-surface fuel adherence amount in accordance with an increase in the degree of opening of the waste gate valve.

3. The control apparatus for an internal combustion engine according to claim 1, wherein the fuel adherence amount calculation device comprises:

a base calculation device that calculates the wall-surface fuel adherence amount based on at least one parameter among a group of parameters comprising a number of engine revolutions, a load, an engine temperature, and an amount of change in the load of the internal combustion engine; and a WGV correspondence correction device that corrects the wall-surface fuel adherence amount based on the WGV parameter.

4. The control apparatus for an internal combustion engine according to claim 3, further comprising a correction execution determination device that corrects the wall-surface fuel adherence amount by means of the WGV correspondence correction device only in a case where a demand arises to change the degree of opening of the waste gate valve by an amount that is greater than a predetermined value.

5. The control apparatus for an internal combustion engine according to claim 1, further comprising:

an intake air pressure sensor that detects an intake air pressure at a position that is on an upstream side of a throttle valve that adjusts an intake air amount of the internal combustion engine and on a downstream side of the compressor of the supercharger;

wherein the fuel adherence amount calculation device uses an output of the intake air pressure sensor as the WGV parameter.

* * * * *